United States Patent
Seidel et al.

(10) Patent No.: US 8,680,201 B2
(45) Date of Patent: Mar. 25, 2014

(54) COMPOUNDING METHOD FOR PRODUCING POLYMER COMPOSITIONS WITH A REDUCED CONTENT OF VOLATILE ORGANIC COMPOUNDS

(75) Inventors: Andreas Seidel, Dormagen (DE); Hans-Jürgen Thiem, Dormagen (DE)

(73) Assignee: Bayer Materialscience AG, Leverkusen (DE)

( * ) Notice: Subject to any disclaimer, the term of this patent is extended or adjusted under 35 U.S.C. 154(b) by 276 days.

(21) Appl. No.: 12/707,711

(22) Filed: Feb. 18, 2010

(65) Prior Publication Data
US 2010/0210789 A1   Aug. 19, 2010

(30) Foreign Application Priority Data
Feb. 19, 2009   (DE) .................. 10 2009 009 680

(51) Int. Cl.
*C08L 51/00* (2006.01)
(52) U.S. Cl.
USPC ............. 525/53; 525/67; 525/241; 525/313; 525/902; 526/64
(58) Field of Classification Search
USPC ............. 525/53, 67, 241, 313, 902; 526/64
See application file for complete search history.

(56) References Cited

U.S. PATENT DOCUMENTS

| | | | |
|---|---|---|---|
| 3,419,634 A | 12/1968 | Vaughn et al. | |
| 3,553,167 A | 1/1971 | Schnell et al. | |
| 3,644,574 A | 2/1972 | Jackson et al. | |
| 3,692,744 A | 9/1972 | Rich et al. | |
| 3,796,677 A * | 3/1974 | Laber et al. | 525/64 |
| 4,013,613 A | 3/1977 | Abolins et al. | |
| 4,075,173 A | 2/1978 | Maruyama et al. | |
| 4,176,224 A | 11/1979 | Bier et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 4,806,593 A | 2/1989 | Kress et al. | |
| 4,812,515 A | 3/1989 | Kress et al. | |
| 4,859,740 A | 8/1989 | Damrath et al. | |
| 4,861,831 A | 8/1989 | Damrath et al. | |
| 4,937,285 A | 6/1990 | Wittmann et al. | |
| 2002/0060378 A1* | 5/2002 | Miyamoto et al. | 264/211 |
| 2003/0175493 A1* | 9/2003 | Naito et al. | 428/304.4 |
| 2005/0014897 A1* | 1/2005 | Eitel et al. | 525/63 |

FOREIGN PATENT DOCUMENTS

| | | |
|---|---|---|
| DE | 1 900 270 | 11/1969 |
| DE | 2 035 390 | 1/1971 |
| DE | 1 495 626 | 6/1971 |
| DE | 2 248 242 | 4/1973 |

(Continued)

OTHER PUBLICATIONS

Machine translation of DE 3206184 (2012).*

(Continued)

*Primary Examiner* — Mark Kaucher
(74) *Attorney, Agent, or Firm* — Miles & Stockbridge P.C.

(57) ABSTRACT

The present invention relates to a compounding method for producing impact-modified thermoplastic compositions with a low content of volatile organic compounds (hereinafter VOCs), wherein relatively inexpensive polymer raw materials with a comparatively elevated initial VOC content may be used, resulting in lowered production costs for producing such VOC-reduced polymer compositions.

16 Claims, 2 Drawing Sheets

(56) References Cited

FOREIGN PATENT DOCUMENTS

| | | |
|---|---|---|
| DE | 2 232 877 | 1/1974 |
| DE | 2 407 674 | 10/1974 |
| DE | 24 07 776 A1 | 4/1975 |
| DE | 27 03 376 A1 | 1/1977 |
| DE | 27 14 544 A1 | 6/1977 |
| DE | 27 15 932 A1 | 10/1978 |
| DE | 28 42 005 A1 | 4/1980 |
| DE | 30 00 610 A1 | 7/1980 |
| DE | 29 40 024 A1 | 4/1981 |
| DE | 30 07 934 A1 | 9/1981 |
| DE | 3206184 | 9/1982 |
| DE | 33 34 782 A1 | 10/1984 |
| DE | 36 31 539 A1 | 3/1988 |
| DE | 36 31 540 A1 | 3/1988 |
| DE | 37 04 655 A1 | 8/1988 |
| DE | 37 04 657 A1 | 8/1988 |
| DE | 38 32 396 A1 | 2/1990 |
| EP | 0 363 608 A1 | 4/1990 |
| EP | 0 534 235 A1 | 3/1993 |
| EP | 0534235 | 3/1993 |
| EP | 0 640 655 A2 | 3/1995 |
| EP | 0 768 157 A1 | 4/1997 |
| EP | 0 867 463 | 9/1998 |
| EP | 0 867 463 A1 | 9/1998 |
| EP | 1 471 093 A1 | 10/2004 |
| EP | 1471093 | 10/2004 |
| GB | 1 409 275 | 10/1975 |
| GB | 1 464 449 | 2/1977 |
| GB | 1 552 558 | 9/1979 |
| WO | 00/00541 A1 | 1/2000 |
| WO | 01/18105 A1 | 3/2001 |
| WO | 2004/069913 A1 | 8/2004 |
| WO | 2008/025446 A1 | 3/2008 |

OTHER PUBLICATIONS

International Search Report based on PCT/EP2010/000800 dated Apr. 14, 2010.

English language International Preliminary Report on Patentability issued Aug. 23, 2011 in corresponding Application No. PCT/EP2010/0008000.

\* cited by examiner

COMPOUNDING METHOD FOR PRODUCING POLYMER COMPOSITIONS WITH A REDUCED CONTENT OF VOLATILE ORGANIC COMPOUNDS

CROSS REFERENCE TO RELATED APPLICATION

This application claims priority to German Application 10 2009 009680 filed Feb. 19, 2009, the content of which is incorporated herein by reference in its entirety.

BACKGROUND

1. Field of Invention

The present invention relates generally to a compounding method for producing impact-modified thermoplastic compositions with a low content of volatile organic compounds (hereinafter VOCs), wherein relatively inexpensive polymer raw materials with a comparatively elevated initial VOC content may be used, resulting in lowered production costs for producing such VOC-reduced polymer compositions.

A compounding method according to the present invention makes this reduction in overall VOC content possible under comparatively mild thermal compounding conditions, which are thereby gentle on the material, i.e. under comparatively low processing temperatures. The decomposition of thermally sensitive components of the compositions is thereby advantageously largely inhibited.

2. Description of Related Art

In polymer processing, compounding describes the production of a finished plastics moulding composition, the compound, from optionally a plurality of polymeric raw materials optionally with the addition of polymer additives such as for example fillers and reinforcing materials, coupling agents, lubricants, stabilisers etc. Compounding predominantly proceeds in kneaders or extruders and comprises the operations of feeding, melting, dispersing, mixing, devolatilising and pressure build-up. Compounding is generally followed by cooling-induced solidification of the compound and pelletisation thereof.

More recently, the requirement has been for the lowest possible content of volatile organic components in plastics mixtures. Devolatilisation during compounding of plastics is accordingly of increased significance. Prior to devolatilisation, the proportion of volatile organic compounds (VOC) in the plastics raw materials (i.e. in the components used for the method) typically amounts to up to 10,000 ppm. It is in practice desired to achieve a VOC content in the finished compound (i.e. for example, in the pellets produced by compounding, cooling and pelletisation) of less than 600 ppm, preferably of less than 400 ppm.

When producing polymer compositions with a low residual volatiles content, said compositions are exposed to a reduced pressure for devolatilisation as a rule in the molten state and at the highest possible temperature, which serves to increase the volatility of the organic substances to be removed from the composition. The reduction in VOCs in the compound brought about thereby is frequently insufficient, however, to meet the increasingly stringent requirements in different fields of application (for example for products for use in motor vehicle interiors or living rooms). This applies in particular to temperature-sensitive polymers or polymer blends, in which the temperature during the devolatilisation process naturally has an upper limit (for example, as explained in detail below, because of the risk of thermally induced elimination of monomers or indeed of thermohydrolytic cleavage of polymer chains with a reduction in the average polymer molecular weight). To achieve the desired low target VOC contents, it is therefore generally necessary, in the prior art methods, only to use polymer raw materials which already have a very low initial VOC content, preferably with a VOC content of at most 600 ppm when producing polymer compositions containing thermosensitive polymers. Such polymer raw materials with low VOC contents have in general to have their VOC content reduced during production thereof by technical measures which are possibly repeated several times, before they are used in the production (compounding) of the polymer composition. Such additional method steps for devolatilising the polymer raw materials have the disadvantage that they result in increased costs relating to production of these polymer raw materials. There is therefore a general need to provide a compounding method which achieves the desired low VOC contents of the target composition even when raw materials with a relatively high VOC content (i.e. for example of more than 600 ppm and up to 2000 ppm) are used, as this would markedly reduce the cost of producing the resultant polymer composition.

In temperature-sensitive polymers or polymer blends, in addition to the residual monomers and solvents to be devolatilised, which are already contained in the raw materials, monomers may also form during the compounding process by thermally induced polymer dissociation. In the case of rubber-modified blends based on a polybutadiene-based impact modifier, such as for example blends of polycarbonate and acrylonitrile-butadiene-styrene terpolymer (PC/ABS blends), this is for example the case with ABS, wherein the polybutadiene contained possibly dissociates to yield 1,3-butadiene. The dissociation kinetics of the polybutadiene is generally highly temperature-dependent, i.e. dissociation increases superproportionally as the temperature increases. The difficulty of achieving process control in the case of compounding lies in the fact that, for effective devolatilisation of the volatile components both a low pressure and a high temperature are necessary, but, at a high temperature, dissociation of the polybutadiene simultaneously greatly increases and thus the 1,3-butadiene content in the final product generally depends less on the concentration thereof in the initial raw materials used and the devolatilisation efficiency of the compounding method and more substantially on the temperature profile during the compounding method. To make matters worse, when energy input is reduced to lower the temperature and avoid dissociation, problems may arise during melting and intermixing of the compound components, which have a negative effect on product quality (i.e. the mechanical properties of the composition). This is true in particular at elevated throughput rates, i.e. short residence times, which are necessary for an economic compounding process.

At the elevated temperatures as would be needed for the necessary devolatilisation according to conventional method according to the previous prior art, and additionally due to the residual moisture content of the polymer raw materials used, polycondensation polymers such as for example polycarbonates, polyesters, polyester carbonates or polyamides may decompose thermohydrolytically with a negative effect on polymer chain length and thus ultimately also on product quality (i.e. the mechanical properties of the composition). To prevent this, complex, cost-intensive predrying of all the raw materials used is generally necessary.

It is in principle also known to use entraining agents to reduce further the residual volatiles content during devolatilisation of polymer melts at a given melt temperature.

WO-A 2008/025446 describes for example a method for compounding polymers and polymer blends, also including PC+ABS compositions, in a screw extruder, wherein the final product has a particularly low content of residual solvents, monomers and oligomers, characterised in that devolatilisation proceeds using an inert entraining agent (for example nitrogen, carbon dioxide or a noble gas), which is introduced into the polymer melt, dispersed therein and subsequently removed again from the product together with the volatile organic compounds by application of reduced pressure in a devolatilising zone. Such a method requires a specific technical design of the extruder with complex extruder peripheral equipment and in this respect cannot generally be implemented using conventional machinery without heavy investment in retrofitting.

In addition, the use of water as an inexpensive entraining agent is known in principle. However, the homogeneous apportioning of water and the homogeneous distribution thereof in the polymer melt necessary for effective devolatilisation is still a technical challenge.

WO-A 2004/069913 describes a method for reducing pollutants and/or odour-emitting substances in polymeric materials using hydrophilic inorganic carrier materials such as zeolites or silicas loaded with 30 to 90 wt. % water as an additive. In this method, however, the hydrophilic inorganic carrier materials remain in the final product and impair the mechanical properties thereof.

EP-A 867 463 and EP-A 1 471 093 describe methods of producing elastomer-modified thermoplastics by mixing elastomer with a thermoplastic, wherein the moist elastomer, in particular a graft polymer, which has been precipitated from a latex, is predewatered to 1 to 50 wt. % residual moisture content and mixed into the thermoplastic present as a melt, characterised in that evaporation of the process water adhering to the elastomer, melting of the elastomer, alloying of the elastomer with the melt of the thermoplastic, and removal of further organic volatile constituents proceeds simultaneously in a process chamber. In this method, the thermoplastic and elastomer are generally used in the range from 1:4 to 4:1. Because of the comparatively long residence time and high thermal loading in this process of the mixture in the process chamber of 2 to 20 minutes and the generally elevated water concentration in the process chamber, this method is not suitable for producing elastomer-modified thermoplastics, in which the thermoplastics are sensitive to hydrolytic degradation.

EP-A 534 235 describes methods of producing impact-modified thermoplastics by compounding rubber latexes which have been mechanically partially dewatered into thermoplastic polymers above the softening points of the thermoplastic polymers, characterised in that the rubbers are partially dewatered in an extruder before being mixed into the thermoplastic polymers and the remaining residual water is removed during compounding by devolatilising devices up- and down-stream of the mixing point. EP-A 534 235 does not disclose any methods for producing rubber-modified polycondensation products, in particular polycarbonates. Due to the comparatively high water concentrations and long residence times at high temperatures generally used in such processes, it may be assumed that they are fundamentally unsuitable for the production of such hydrolysis-sensitive compositions.

SUMMARY

A problem underlying the present invention was that of providing a method which proceeds under thermally mild conditions for the inexpensive production of impact-modified thermoplastics polymer compositions comprising at least one impact modifier and a further organic thermoplastic polymer different therefrom, wherein the content of volatile organic compounds (VOC) in the resultant composition is reduced in comparison with the corresponding content of volatile organic substances in the compositions produced according to methods known from the prior art. The resultant impact-modified compositions are here preferably intended to have a total content of volatile organic compounds (VOC) of at most 600 ppm, preferably of at most 400 ppm, measured by means of headspace gas chromatography.

It has surprisingly been found that a method of producing an impact-modified polymer composition comprising A) at least one rubber-free organic thermoplastic polymer,
B) at least one pulverulent graft polymer consisting of
  B.1) a vinyl (co)polymer as envelope, and
  B.2) an elastomer as core,
  wherein the graft polymer has a residual content of volatile organic compounds (VOC) of no more than 10,000 ppm, preferably of more than 600 ppm and up to 8000 ppm, in particular of more than 800 ppm and up to 6000 ppm,
C) optionally a further polymer resin selected from at least one polymer of the group consisting of a rubber-free vinyl (co)polymer C.1 and a pellet-form rubber-modified vinyl (co)polymer C.2,
D) optionally conventional commercial polymer additives different from Components A, B and C, wherein (i) a mixture with a water content (relative to this mixture produced in step (i)) of 2 to 40 wt. %, preferably of 5 to 32 wt. %, particularly preferably of 8 to 25 wt. % is produced from
  the total quantity or a proportion of the Component B used,
  optionally the total quantity or proportions of Components A, C and/or D
  and 0.2 to 7 parts by weight, preferably 0.4 to 7 parts by weight, particularly preferably 0.7 to 5 parts by weight, most preferably 1.0 to 3 parts by weight (relative to the total composition of A+B+C+D=100 parts by weight) of water, (ii) the mixture resulting from step (i) together with the respective total quantities or the proportions of Components A to D of the composition remaining after step (i) is heated in a compounding unit by input of thermal and/or mechanical energy to a temperature of 200° C. to 350° C., preferably 220° C. to 320° C., particularly preferably 230° C. to 300° C., and thereby melted, mixed, dispersed in one another and subsequently devolatilised in a devolatilising zone of the compounding unit,
  wherein the compounding unit comprises a melting and mixing zone or a combined melting and mixing zone (this "melting and mixing zone" being designated below as "kneading and melting zone"),
  wherein the mixture resulting from step (i) may be metered into the compounding unit completely or optionally in each case partially (a) on the one hand together with the residual quantities of Components A to D of the composition into a zone, hereinafter designated a feed zone, upstream of the melting zone, or (b) alternatively into a zone downstream of the melting zone directly into the premixed melt of the components of the composition metered into the feed zone of the compounding unit,
  wherein an absolute pressure $p_{abs}$ of at most 800 mbar, preferably at most 500 mbar, particularly preferably at most 200 mbar is established in the devolatilising zone of the compounding unit, wherein the mean residence time, for which the melt of the composition is in contact with the water, which is introduced into the method via the mixture produced in method step (i), is preferably limited to at most 90 s, particularly preferably at most 60 s, especially preferably to at most 30 s, (iii) the melt resulting from step (ii) is resolidified by cooling on discharge from the compounding unit, is capable of solving the above-stated problem.

DETAILED DESCRIPTION

The application of reduced pressure in step (ii) has the technical effect that the water contained in the mixture resulting from method step (i) is removed again from the composition in the form of water vapour together with a proportion of the volatile organic carbon compounds.

The compounding unit is preferably a twin-screw extruder, particularly preferably a twin-screw extruder with shafts rotating in the same direction, wherein the twin-screw extruder has a screw length/diameter ratio preferably of 32 to 44, particularly preferably of 34 to 38.

Figure 1:
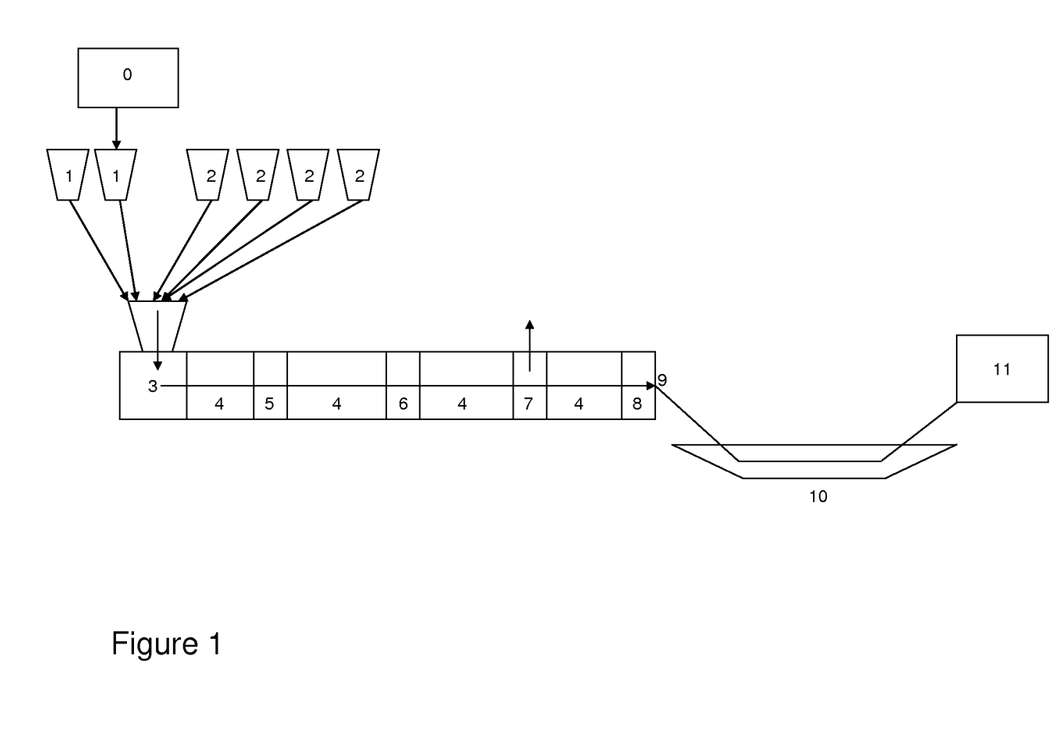
FIGS. 1 and 2 depict embodiments of the present disclosure.

A method according to the present invention in an embodiment with feed of the mixture according to method step (i) via the main feed zone of the compounder is illustrated by the schematic FIG. 1. The method according to the present invention in the embodiment with at least partial feed of the mixture according to method step (i) via an ancillary extruder is illustrated by the schematic FIG. 2. In both Figures the following reference numerals are used:

| | |
|---|---|
| 0 | Mixing unit |
| 1 | Powder metering units (optional in the structure shown in FIG. 2) |
| 2 | Pellet metering units |
| 3 | Feed zone of the twin-screw extruder (hereinafter ZSK) |
| 4 | Conveying zones |
| 5 | Kneading and melting zone |
| 6 | Mixing and dispersing zone (optional in the structure shown in FIG. 1) |
| 7 | Devolatilising/vacuum zone |
| 8 | Pressure build-up zone |
| 9 | Die plate with die |
| 10 | Water bath |
| 11 | Pelletiser |
| 12 | Powder metering unit |
| 13 | Ancillary extruder |

Component A is preferably at least one thermoplastic polymer produced by polycondensation, particularly preferably at least one polymer selected from the group consisting of polycarbonate, polyester carbonate, polyester and polyamide, most preferably at least one polymer selected from the group consisting of aromatic polycarbonate, aromatic polyester carbonate and aromatic polyester, absolutely most preferably aromatic polycarbonate.

Component B is preferably an ABS graft polymer (acrylonitrile-butadiene-styrene graft terpolymer) or MBS graft polymer (methyl methacrylate-butadiene-styrene graft terpolymer).

In a preferred embodiment, the mixture according to method step (i) consists solely of pulverulent Components A to D of the composition and water. In a preferred embodiment, the mixtures produced according to method step (i) are flowable powders.

In a particularly preferred embodiment of the method, in step (i) a mixture is produced which consists of 5 to 15 parts by weight (relative to the total of Components A to D=100 parts by weight) of Component B, 0 to 5 parts by weight, preferably 0.1 to 5 parts by weight (relative to the total of Components A to D=100 parts by weight) of pulverulent Component D and 8 to 25 parts by weight, relative to the mixture produced in this step (i), of water.

For the purposes of the present invention, "powder" or "pulverulent" means a component or a mixture of a plurality of components which is present in the solid state of aggregation and in which the particles have particle sizes of less than 2 mm, preferably of less than 1 mm, in particular of less than 0.5 mm.

For the purposes of the present invention, the term "pellets" means a component or a mixture of a plurality of components which is present in the solid state of aggregation, wherein the solid particles have a particle size of at least 2 mm and in general of no more than 10 mm. The pellet grains may have any desired shape, for example they may be lenticular, spherical or cylindrical.

A method according to the present invention is in particular also suitable for producing impact-modified polymer compositions with a low VOC content from such polymer raw materials A to C with a comparatively high initial VOC content. In this respect, the present invention preferably also relates to such a method in which the content of VOCs introduced into the compounding process by the polymeric raw materials A to C, i.e. the total of the VOC contents of these initial raw materials, weighted in each case with the respective percentages of Components A to C in the composition, is more than 600 ppm and up to 2000 ppm, in particular more than 800 ppm and up to 1500 ppm.

The present invention further provides the compositions produced according to one of the above-described methods according to the present invention and mouldings produced from such compositions.

Component A

In principle all types of thermoplastic polymers or mixtures of two or more than two such thermoplastic polymers may be considered as Component A.

Examples which may be stated here are polyolefins (such as polyethylene and polypropylene), vinyl (co)polymers (such as polyvinyl chloride, styrene (co)polymers, polyacrylates, polyacrylonitrile), polyvinyl acetate, thermoplastic polyurethanes, polyacetals (such as polyoxymethylene and polyphenylene ether), and in particular and preferably also condensation polymers such as for example polyamides, polyimides, polycarbonates, polyesters, polyester carbonates, polysulfones, polyarylates, polyaryl ethers, polyphenylene ethers, polyaryl sulfones, polyaryl sulfides, polyether sulfones, polyphenylene sulfide, polyether ketones, polyamideimides, polyetherimides and polyesterimides.

Component A particularly preferably takes the form of at least one polymer selected from the groups consisting of polycarbonate, polyester carbonate, polyester and polyamide, particularly preferably at least one polymer selected from the group consisting of aromatic polycarbonate, aromatic polyester carbonate and aromatic polyester.

Component A aromatic polycarbonates which are suitable according to the present invention are known from the literature or may be produced using methods known from the literature (for the production of aromatic polycarbonates see for example Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610, DE-A 3 832 396; for the production of aromatic polyester carbonates see for example DE-A 3 077 934).

The production of aromatic polycarbonates proceeds for example by reacting diphenols with carbonic acid halides, preferably phosgene, and/or with aromatic dicarboxylic acid dihalides, preferably benzenedicarboxylic acid dihalides, by the phase boundary method, optionally using chain terminators, for example monophenols, and optionally using trifunctional or more than trifunctional branching agents, for example triphenols or tetraphenols. Production by means of a melt polymerisation method by reacting diphenols with for example diphenyl carbonate is likewise possible.

Diphenols for producing aromatic polycarbonates and/or aromatic polyester carbonates are preferably those of the formula (I)

wherein
A is a single bond, $C_1$ to $C_5$ alkylene, $C_2$ to $C_5$ alkylidene, $C_5$ to $C_6$ cycloalkylidene, —O—, —SO—, —CO—, —S—, —SO$_2$—, $C_6$ to $C_{12}$ arylene, to which further aromatic rings optionally containing heteroatoms may be fused, or a residue of the formula (II) or (III)

B is in each case $C_1$ to $C_{12}$ alkyl, preferably methyl, halogen, preferably chlorine and/or bromine
x is in each case mutually independently 0, 1 or 2,
p is 1 or 0, and
$R^5$ and $R^6$, individually selectably for each $X^1$, mutually independently mean hydrogen or $C_1$ to $C_6$ alkyl, preferably hydrogen, methyl or ethyl,
$X^1$ is carbon and
m denotes an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis(hydroxyphenyl) ethers, bis(hydroxyphenyl)sulfoxides, bis(hydroxyphenyl) ketones, bis-(hydroxyphenyl)sulfones and α,α-bis-(hydroxyphenyl)-diisopropyl-benzenes as well as the ring-brominated and/or ring-chlorinated derivatives thereof.

Particularly preferred diphenols are 4,4'-dihydroxydiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulfide, 4,4'-dihydroxydiphenyl sulfone and the di- and tetrabrominated or chlorinated derivatives thereof such as for example 2,2-bis(3-chloro-4-hydroxyphenyl)propane, 2,2-bis-(3,5-dichloro-4-hydroxyphenyl)propane or 2,2-bis-(3,5-dibromo-4-hydroxyphenyl)propane. 2,2-Bis-(4-hydroxyphenyl)propane (bisphenol A) is especially preferred.

The diphenols may be used individually or as any desired mixtures. The diphenols are known from the literature or may be obtained using methods known from the literature.

Chain terminators suitable for producing the thermoplastic, aromatic polycarbonates are for example phenol, p-chlorophenol, p-tert.-butylphenol or 2,4,6-tribromophenol, and also long-chain alkylphenols, such as 4-[2-(2,4,4-trimethylpentyl)]-phenol, 4-(1,3-tetramethylbutyl)-phenol according to DE-A 2 842 005 or monoalkylphenol or dialkylphenols having a total of 8 to 20 carbon atoms in the alkyl substituents, such as 3,5-di-tert.-butylphenol, p-iso-octylphenol, p-tert.-octylphenol, p-dodecylphenol and 2-(3,5-dimethylheptyl)-phenol and 4-(3,5-dimethylheptyl)-phenol. The quantity of chain terminators to be used amounts in general to between 0.5 mol %, and 10 mol %, relative to the total number of moles of the diphenols used in each case.

The thermoplastic, aromatic polycarbonates have average weight average molecular weights (Mw, measured for example using GPC, an ultracentrifuge or scattered light measurement) of 10,000 to 200,000 g/mol, preferably 15,000 to 80,000 g/mol, particularly preferably 24,000 to 32,000 g/mol.

The thermoplastic, aromatic polycarbonates may be branched in known manner, preferably by incorporating 0.05 to 2.0 mol %, relative to the total of the diphenols used, of trifunctional or more than trifunctional compounds, for example those with three or more phenolic groups.

Both homopolycarbonates and copolycarbonates are suitable. Component A copolycarbonates according to the present invention may also be produced using 1 to 25 wt. %, preferably 2.5 to 25 wt. % (relative to the total quantity of diphenols to be used) of polydiorganosiloxanes with hydroxyaryloxy terminal groups. These are known (U.S. Pat. No. 3,419,634) and may be produced using methods known from the literature. The production of copolycarbonates containing polydiorganosiloxanes is described in DE-A 3 334 782.

In addition to bisphenol A homopolycarbonates, preferred polycarbonates are the copolycarbonates of bisphenol A with up to 15 mol %, relative to the total number of moles of diphenols, of diphenols other than those stated to be preferred or particularly preferred, in particular 2,2-bis(3,5-dibromo-4-hydroxyphenyl)propane.

Aromatic dicarboxylic acid dihalides for the production of aromatic polyester carbonates are preferably the diacid dichlorides of isophthalic acid, terephthalic acid, diphenyl ether 4,4'-dicarboxylic acid and naphthalene 2,6-dicarboxylic acid.

Particularly preferred are mixtures of the diacid dichlorides of isophthalic acid and terephthalic acid in a ratio of between 1:20 and 20:1.

When producing polyester carbonates, a carbonic acid halide, preferably phosgene, is additionally used as a difunctional acid derivative.

In addition to the monophenols already mentioned, suitable chain terminators for the production of aromatic polyester carbonates are the chloroformic acid esters of said monophenols as well as the acid chlorides of aromatic monocarboxylic acids, which may optionally be substituted by $C_1$ to $C_{22}$ alkyl groups or by halogen atoms, and aliphatic $C_2$ to $C_{22}$ monocarboxylic acid chlorides.

The quantity of chain terminators amounts in each case to 0.1 to 10 mol %, relative, in the case of phenolic chain terminators, to the moles of diphenols and, in the case of monocarboxylic acid chloride chain terminators, to the moles of dicarboxylic acid dichlorides.

Aromatic hydroxycarboxylic acids may also be incorporated into the aromatic polyester carbonates.

The aromatic polyester carbonates may be both linear and branched in known manner (see in this respect DE-A 2 940 024 and DE-A 3 007 934).

The branching agents used may be for example tri- or polyfunctional carboxylic acid chlorides, such as trimesic acid trichloride, cyanuric acid trichloride, 3,3',4,4'-benzophenone tetracarboxylic acid tetrachloride, 1,4,5,8-naphthalene tetracarboxylic acid tetrachloride or pyromellitic acid tetrachloride, in quantities of 0.01 to 1.0 mol % (relative to the dicarboxylic acid dichlorides used) or tri- or polyfunctional phenols, such as phloroglucinol, 4,6-dimethyl-2,4,6-tri-(4-hydroxyphenyl)-hept-2-ene, 4,6-dimethyl-2,4-6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis[4,4-bis(4-hydroxyphenyl)cyclohexyl]propane, 2,4-bis(4-hydroxyphenylisopropyl)phenol, tetra-(4-hydroxyphenyl)methane, 2,6-bis(2-hydroxy-5-methyl-benzyl)-4-methyl-phenol, 2-(4-hydroxyphenyl)-2-(2,4-dihydroxyphenyl)propane, tetra-(4-[4-hydroxyphenylisopropyl]-phenoxy)methane, 1,4-bis[4,4'-dihydroxytriphenyl)-methyl]-benzene, in quantities of 0.01 to 1.0 mol % relative to the diphenols used. Phenolic branching agents may be initially introduced with the diphenols, while acid chloride branching agents may be introduced together with the acid dichlorides.

The proportion of carbonate structural units in the thermoplastic, aromatic polyester carbonates may vary as desired. The proportion of carbonate groups preferably amounts to up to 100 mol %, in particular up to 80 mol %, particularly preferably up to 50 mol %, relative to the total number of ester groups and carbonate groups. Both the ester and the carbonate moieties of the aromatic polyester carbonates may be present in the polycondensate in the form of blocks or randomly distributed.

The relative solution viscosity (ηrel) of the aromatic polycarbonates and polyester carbonates is in the range from 1.18 to 1.4, preferably 1.20 to 1.32 (measured using solutions of 0.5 g polycarbonate or polyester carbonate in 100 ml of methylene chloride solution at 25° C.).

In a more preferred embodiment, the polyalkylene terephthalates feasible according to the present invention as Component A are reaction products of aromatic dicarboxylic acids or their reactive derivatives, such as dimethyl esters or anhydrides, and aliphatic, cycloaliphatic or araliphatic diols and mixtures of these reaction products.

Particularly preferred polyalkylene terephthalates contain at least 80 wt. %, preferably at least 90 wt. %, of terephthalic acid residues relative to the dicarboxylic acid component and at least 80 wt. %, preferably at least 90 mol %, of ethylene glycol and/or 1,4-butanediol residues relative to the diol component.

In addition to terephthalic acid residues, the preferred polyalkylene terephthalates may contain up to 20 mol %, preferably up to 10 mol %, of residues of other aromatic or cycloaliphatic dicarboxylic acids with 8 to 14 C atoms or aliphatic dicarboxylic acids with 4 to 12 C atoms, such as for example residues of phthalic acid, isophthalic acid, 2,6-naphthalenedicarboxylic acid, 4,4'-diphenyldicarboxylic acid, succinic acid, adipic acid, sebacic acid, azelaic acid, cyclohexanediacetic acid.

In addition to ethylene glycol or 1,4-butanediol residues, the preferred polyalkylene terephthalates may contain up to 20 mol %, preferably up to 10 mol %, of other aliphatic diols with 3 to 12 C atoms or cycloaliphatic diols with 6 to 21 C atoms, for example residues of 1,3-propanediol, 2-ethyl-1,3-propanediol, neopentyl glycol, 1,5-pentanediol, 1,6-hexanediol, 1,4-cyclohexanedimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (DE-A 2 407 674, 2 407 776, 2 715 932).

The polyalkylene terephthalates may be branched by the incorporation of relatively small quantities of tri- or tetrahydric alcohols or tribasic or tetrabasic carboxylic acids, for example according to DE-A 1 900 270 and U.S. Pat. No. 3,692,744. Examples of preferred branching agents are trimesic acid, trimellitic acid, trimethylolethane, trimethylolpropane and pentaerythritol.

Particular preference is given to polyalkylene terephthalates which have been produced solely from terephthalic acid and the reactive derivatives thereof (for example the dialkyl esters thereof) and ethylene glycol and/or 1,4-butanediol, and to mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The preferably used polyalkylene terephthalates generally have an intrinsic viscosity of 0.4 to 1.5 dl/g, preferably of 0.5 to 1.2 dl/g, measured in phenol/o-dichlorobenzene (1:1 parts by weight) at 25° C. in an Ubbelohde viscosimeter.

The polyalkylene terephthalates may be produced using known methods (cf. for example Kunststoff-Handbuch, volume VIII, p. 695 et seq., Carl-Hanser-Verlag, Munich 1973).

Component A may be used as powder and/or pellets.

Component A is used in the compositions according to the present invention preferably in a quantity of 10 to 95 parts by weight, preferably of 30 to 90 parts by weight, particularly preferably of 40 to 80 parts by weight, in each case relative to the total of the parts by weight of Components A to D=100 parts by weight.

Component B

Component B is a pulverulent graft polymer or a mixture of a plurality of pulverulent graft polymers. Graft polymers preferably used as Component B comprise one or more graft polymers of B.1 5 to 95, preferably 20 to 90, in particular 25 to 50 wt. %, relative to Component B, of at least one vinyl monomer B.2 95 to 5, preferably 80 to 10, in particular 75 to 50 wt. %, relative to Component B, of one or more grafting backbones with glass transition temperatures of <10° C., preferably <0° C., particularly preferably <−20° C.

The grafting backbone B.2 has in general an average particle size ($d_{50}$ value) of 0.05 to 10 μm, preferably of 0.1 to 2 μm, particularly preferably of 0.15 to 0.6 μm.

Monomers B.1 are preferably mixtures of

B.1.1 50 to 99, preferably 60 to 80, in particular 70 to 80 parts by weight, relative to B.1, of vinyl aromatics and/or ring-substituted vinyl aromatics (such as styrene, α-methylstyrene, p-methylstyrene, p-chlorostyrene) and/or meth-acrylic acid ($C_1$-$C_8$) alkyl esters, such as methyl methacrylate, ethyl methacrylate, and B.1.2 1 to 50, preferably 20 to 40, in particular 20 to 30 parts by weight, relative to B.1, of vinyl cyanides (unsaturated nitriles such as acrylonitrile and methacrylonitrile) and/or (meth)acrylic acid ($C_1$-$C_8$) alkyl esters, such as methyl methacrylate, n-butyl acrylate, t-butyl acrylate, and/or derivatives (such as anhydrides and imides) of unsaturated carboxylic acids, for example maleic anhydride and N-phenylmaleimide.

Preferred monomers B.1.1 are selected from among at least one of the monomers styrene, α-methylstyrene and methyl methacrylate, preferred monomers B.1.2 are selected from among at least one of the monomers acrylonitrile, maleic anhydride and methyl methacrylate. Particularly preferred monomers are B.1.1 styrene and B.1.2 acrylonitrile.

Grafting backbones B.2 suitable for the graft polymers B are for example diene rubbers, EP(D)M rubbers, i.e. those based on ethylene/propylene and optionally diene, acrylate, polyurethane, silicone, chloroprene and ethylene/vinyl acetate rubbers and silicone/acrylate composite rubbers.

Preferred grafting backbones B.2 are diene rubbers based for example on butadiene and isoprene or mixtures of diene rubbers or copolymers of diene rubbers or mixtures thereof with further copolymerisable monomers (for example according to B.1.1 and B.1.2), with the proviso that the glass transition temperature of Component B.2 is <10° C., preferably <0° C., particularly preferably <−20° C. Pure polybutadiene rubber is particularly preferred.

Particularly preferred polymers B are for example ABS or MBS polymers (emulsion, bulk and suspension ABS), as described for example in DE-OS 2 035 390 (=U.S. Pat. No. 3,644,574) or in DE-OS 2 248 242 (=GB patent 1 409 275) or in Ullmanns Enzyklopädie der Technischen Chemie, vol. 19 (1980), p. 280 ff.

The graft copolymers B are produced by free-radical polymerisation, for example by emulsion, suspension, solution or bulk polymerisation, preferably by emulsion polymerisation.

Particularly suitable graft polymers B have a core-shell structure.

The gel content of the grafting backbone B.2 amounts in the case of graft polymers produced by emulsion polymerisation to at least 30 wt. %, preferably at least 40 wt. % (measured in toluene).

Further particularly suitable graft rubbers are ABS polymers produced by redox initiation with an initiator system comprising organic hydroperoxide and ascorbic acid according to U.S. Pat. No. 4,937,285.

Since it is known that, in the grafting reaction, the grafting monomers are not necessarily all grafted onto the grafting backbone, graft polymers B are understood according to the present invention also to mean those products which are obtained by (co)polymerisation of the grafting monomers in the presence of the grafting backbone and also arise during working up. These products may consequently also contain free (co)polymer of the graft monomers, i.e. (co)polymer not chemically bound to the rubber.

Suitable acrylate rubbers according to B.2 are preferably polymers of acrylic acid alkyl esters, optionally with up to 40 wt. %, relative to B.2, of other polymerisable, ethylenically unsaturated monomers. The preferred polymerisable acrylic acid esters include $C_1$ to $C_8$ alkyl esters, for example methyl, ethyl, butyl, n-octyl and 2-ethylhexyl esters; haloalkyl esters, preferably halo-$C_1$-$C_8$-alkyl esters, such as chloroethyl acrylate and mixtures of these monomers.

For crosslinking, monomers with more than one polymerisable double bond may be copolymerised. Preferred examples of crosslinking monomers are esters of unsaturated monocarboxylic acids with 3 to 8 C atoms and unsaturated monovalent alcohols with 3 to 12 C atoms, or saturated polyols with 2 to 4 OH groups and 2 to 20 C atoms, such as ethylene glycol dimethacrylate, allyl methacrylate; polyunsaturated heterocyclic compounds, such as trivinyl and triallyl cyanurate; polyfunctional vinyl compounds, such as di- and trivinylbenzenes; and also triallyl phosphate and diallyl phthalate. Preferred crosslinking monomers are allyl methacrylate, ethylene glycol dimethacrylate, diallyl phthalate and heterocyclic compounds comprising at least three ethylenically unsaturated groups. Particularly preferred crosslinking monomers are the cyclic monomers triallyl cyanurate, triallyl isocyanurate, triacryloylhexahydro-s-triazine, triallyl benzenes. The quantity of crosslinked monomers amounts preferably to 0.02 to 5, in particular 0.05 to 2 wt. %, relative to the grafting backbone B.2. In the case of cyclic crosslinking monomers with at least three ethylenically unsaturated groups it is advantageous to limit the quantity to below 1 wt. % of the grafting backbone B.2.

Preferred "other" polymerisable, ethylenically unsaturated monomers, which may, in addition to the acrylic acid esters, optionally serve to produce the grafting backbone B.2, are for example acrylonitrile, styrene, α-methylstyrene, acrylamides, vinyl $C_1$-$C_6$ alkyl ethers, methyl methacrylate, butadiene. Acrylate rubbers preferred as grafting backbone B.2 are emulsion polymers, which exhibit a gel content of at least 60 wt. %.

Further suitable grafting backbones according to B.2 are silicone rubbers with active grafting sites, such as are described in DE-OS 3 704 657, DE-OS 3 704 655, DE-OS 3 631 540 and DE-OS 3 631 539.

The gel content of the grafting backbone B.2 or of the graft polymers B is determined at 25° C. in a suitable solvent as the proportion which is insoluble in said solvents (M. Hoffmann, H. Krömer, R. Kühn, Polymeranalytik I and II, Georg Thieme-Verlag, Stuttgart 1977).

The average particle size d50 is the diameter above and below which are located in each case 50 wt. % of the particles. It may be determined by means of ultracentrifuge measurement (W. Scholtan, H. Lange, Kolloid, Z. and Z. Polymere 250 (1972), 782-796).

Component B is used in the compositions according to the present invention preferably in a quantity of 3 to 60 parts by weight, preferably of 5 to 40 parts by weight, particularly preferably of 5 to 30 parts by weight, in each case relative to the total of the parts by weight of Components A to D=100 parts by weight.

Component C

Component C is optional. The Component C.1 rubber-free vinyl (co)polymers are rubber-free homo- and/or copolymers of at least one monomer from the group comprising vinyl aromatics, vinyl cyanides (unsaturated nitriles), (meth) acrylic acid ($C_1$ to $C_8$) alkyl esters, unsaturated carboxylic acids and derivatives (such as anhydrides and imides) of unsaturated carboxylic acids.

Particularly suitable are (co)polymers C.1 comprising

C.1.1 50 to 99 wt. %, preferably 60 to 80, in particular 70 to 80 parts by weight, in each case relative to (co)polymer C.1, of at least one monomer selected from the group of vinyl aromatics (such as for example styrene, α-methylstyrene), ring-substituted vinyl aromatics (such as for example p-methylstyrene, p-chlorostyrene) and (meth) acrylic acid ($C_1$-$C_8$) alkyl esters (such as for example methyl methacrylate, n-butyl acrylate, tert.-butyl acrylate) and C.1.2 1 to 50 wt. %, preferably 20 to 40, in particular 20 to 30 parts by weight, in each case relative to (co)polymer C.1, of at least one monomer selected from the group of vinyl cyanides (such as for example unsaturated nitriles such as acrylonitrile and methacrylonitrile), (meth)acrylic acid ($C_1$-$C_8$) alkyl esters (such as for example methyl methacrylate, n-butyl acrylate, tert.-butyl acrylate), unsaturated carboxylic acids and derivatives of unsaturated carboxylic acids (for example maleic anhydride and N-phenylmaleimide).

These (co)polymers C.1 are resinous, thermoplastic and free of rubber. The copolymer of C.1.1 styrene and C.1.2 acrylonitrile is particularly preferred.

Such (co)polymers C.1 are known and may be produced by free-radical polymerisation, in particular by emulsion, suspension, solution or bulk polymerisation. The (co)polymers preferably have average molecular weights Mw (weight-average, determined by GPC) of between 15,000 and 250,000 g/mol.

The rubber-free (co)polymers C.1 may be used as powder and/or as pellets.

The Component C.2 rubber-modified vinyl (co)polymers are selected from at least one polymer of the group consisting of C.2.1 graft polymers present in pellet form and C.2.2 precompounds present in pellet form of at least one graft polymer C.2.2.1 and at least one rubber-free vinyl (co)polymer C.1.

Here, the graft polymers according to Components C.2.1 and C.2.2.1 are in each case graft polymers which correspond with regard to chemical structure and production to the description of Component B, wherein Components C.2.1 and C.2.2.1 differ from the description of Component B however in that C.2.1 comprises graft polymers which are present in pellet form and C.2.2.1 comprises such graft polymers which may be present in either pellet or powder form.

For the purposes of the present invention, a precompound should be taken to mean such mixtures of graft polymers C.2.2.1 and rubber-free vinyl (co)polymers C.1 which have been heated in a compounding unit, for example a kneading reactor or twin-shaft extruder, by input of thermal and/or mechanical energy to a temperature of 180° C. to 300° C., preferably 200° C. to 280° C., particularly preferably 220° C. to 260° C., and thereby melted, mixed, dispersed in one another and cooled down again and pelletised. In a preferred embodiment, the graft polymer C.2.2.1 is used in the moist state (i.e. in the presence of water) in accordance with the methods described in EP 0 768 157 A1 and EP 0 867 463 A1.

Component C.2.2. precompounds preferably contain 10 to 70 parts by weight, particularly preferably 20 to 60 parts by weight, in particular preferably 25 to 55 parts by weight (in each case relative to the precompound) of graft polymer C.2.2.1 and preferably 30 to 90 parts by weight, particularly preferably 40 to 80 parts by weight, especially preferably 45 to 75 parts by weight (in each case relative to the precompound) of rubber-free vinyl (co)polymer C.1.

Component C is used in the compositions according to the present invention preferably in a quantity of 0 to 60 parts by weight, preferably of 0 to 40 parts by weight, particularly preferably of 5 to 35 parts by weight, in each case relative to the total of the parts by weight of Components A to D=100 parts by weight.

Component D

The composition may optionally comprise one or more conventional commercial polymer additives as Component D. The conventional commercial polymer additives according to Component D may take the form of additives such as for example flame retardants (for example phosphorus or halogen compounds), flameproofing synergists (for example nanoscale metal oxides), smoke-retarding additives (for example boric acid or borates), antidripping agents (for example compounds of the substance classes of fluorinated polyolefins, silicones and aramid fibres), internal and external lubricants and mould release agents (for example pentaerythritol tetrastearate, montan wax or polyethylene wax), rheological auxiliaries (for example low molecular weight vinyl (co)polymers), antistatic agents (for example block copolymers consisting of ethylene oxide and propylene oxide, other polyethers or polyhydroxyethers, polyetheramides, polyesteramides or sulfonic acid salts), conductivity additives (for example conductive soot or carbon nanotubes), stabilisers (for example UV/light stabilisers, heat stabilisers, antioxidants, transesterification inhibitors, antihydrolysis agents), antibacterially active additives (for example silver or silver salts), scratch resistance-improving additives (for example silicone oils or hard fillers such as ceramic (hollow) spheres), IR absorbents, optical brighteners, fluorescent additives, fillers and reinforcing materials (for example talc, optionally ground glass or carbon fibres, glass or ceramic (hollow) spheres, mica, kaolin, $CaCO_3$ and glass flakes) and dyes and pigments (for example carbon black, titanium dioxide or iron oxide) and Brønsted acid compounds as base scavengers, or indeed of mixtures of a plurality of the stated additives.

Phosphorus-containing compounds are preferably used as the Component D flame retardants. These are preferably selected from among the groups of mono- and oligomeric phosphorus and phosphonic acid esters, phosphonate amines and phosphazenes, wherein mixtures of several components selected from among one or more of these groups may also be used as flame retardants. Other halogen-free phosphorus compounds not specifically mentioned here may be used alone or in any desired combination with other halogen-free phosphorus compounds.

Preferred mono- and oligomeric phosphorus or phosphonic acid esters are phosphorus compounds of the general formula (IV)

in which $R^1$, $R^2$, $R^3$ and $R^4$, mutually independently mean in each case optionally halogenated $C_1$ to $C_8$ alkyl; $C_5$ to $C_6$ cycloalkyl, $C_6$ to $C_{20}$ aryl or $C_7$ to $C_{12}$ aralkyl in each case optionally substituted by alkyl, preferably $C_1$ to $C_4$ alkyl and/or halogen, preferably chlorine or bromine, n mutually independently means 0 or 1, q means 0 to 30 and X means a mono- or polynuclear aromatic residue with 6 to 30 C atoms, or a linear or branched aliphatic residue with 2 to 30 C atoms, which may be OH-substituted and contain up to 8 ether bonds.

Preferably, $R^1$, $R^2$, $R^3$ and $R^4$ mutually independently denote $C_1$ to $C_4$ alkyl, phenyl, naphthyl or phenyl-$C_1$-$C_4$-alkyl. The aromatic groups $R^1$, $R^2$, $R^3$ and $R^4$ may in turn be substituted with halogen and/or alkyl groups, preferably chlorine, bromine and/or $C_1$ to $C_4$ alkyl. Particularly preferred aryl residues are cresyl, phenyl, xylenyl, propylphenyl or butylphenyl and the corresponding brominated and chlorinated derivatives thereof.

X in the formula (IV) preferably means a mono- or polynuclear aromatic residue with 6 to 30 C atoms. This is preferably derived from diphenols of the formula (I).

n in the formula (IV) may mutually independently be 0 or 1, preferably n is equal to 1.

q denotes values of 0 to 30, preferably 0.3 to 20, particularly preferably 0.5 to 10, in particular 0.5 to 6, very particularly preferably 1.1 to 1.6.

X particularly preferably denotes or the chlorinated or brominated derivatives thereof, in particular X is derived from resorcinol, hydroquinone, bisphenol A or diphenylphenol. Particularly preferably, X is derived from bisphenol A.

Mixtures of various phosphates may also be used as Component D according to the present invention.

Phosphorus compounds of the formula (IV) are in particular tributyl phosphate, triphenyl phosphate, tricresyl phosphate, diphenylcresyl phosphate, diphenyloctyl phosphate, diphenyl-2-ethylcresyl phosphate, tri-(isopropylphenyl) phosphate, resorcinol-bridged oligophosphate and bisphenol A-bridged oligophosphate. The use of oligomeric phosphoric acid esters of the formula (IV), which derive from bisphenol A, is especially preferred.

Component D is most preferably bisphenol A-based oligophosphate according to formula (IVa).

The Component D phosphorus compounds are known (cf. for example EP-A 0 363 608, EP-A 0 640 655) or may be produced analogously in accordance with known methods (for example Ullmanns Enzyklopädie der technischen Chemie, vol. 18, p. 301 ff. 1979; Houben-Weyl, Methoden der organischen Chemie, vol. 12/1, p. 43; Beilstein vol. 6, p. 177).

If mixtures of different phosphorus compounds are used and in the case of oligomeric phosphorus compounds, the stated q-value is the average q-value. The average q-value may be determined in that the composition of the phosphorus compound (molecular weight distribution) is determined by means of suitable methods (gas chromatography (GC), high pressure liquid chromatography (HPLC), gel permeation chromatography (GPC)) and the average values for q are calculated therefrom.

In addition, phosphonate amines and phosphazenes, as described in WO 00/00541 and WO 01/18105, may be used as flame retardants.

The flame retardants may be used alone or in any desired mixture or in a mixture with other flame retardants.

In a preferred embodiment, the flame retardants are used in combination with polytetrafluoroethylene (PTFE) as an anti-dripping agent.

As a filler, naturally occurring or synthetically produced talc is preferably used as Component D.

Pure talc has the chemical composition 3MgO.4SiO2.H2O and thus an MgO content of 31.9 wt. %, an SiO2 content of 63.4 wt. % and a chemically bound water content of 4.8 wt. %. It is a silicate with a multilayer structure.

Naturally occurring talc materials do not in general have the above-listed ideal composition, since they are contaminated by partial replacement of magnesium by other elements, by partial replacement of silicon, by for example aluminum and/or by intergrowth with other minerals such as for example dolomite, magnesite and chlorite.

Those talc types with a particularly high level of purity are preferably used as Component D. These are characterised by an MgO content of 28 to 35 wt. %, preferably 30 to 33 wt. %, particularly preferably 30.5 to 32 wt. %, and an SiO2 content of 55 to 65 wt. %, preferably 58 to 64 wt. %, particularly preferably 60 to 62.5 wt. %. Particularly preferred talc types are moreover distinguished by an Al2O3 content of less than 5 wt. %, particularly preferably less than 1 wt. %, in particular less than 0.7 wt. %.

Use of the talc in the form of finely ground types with an average particle diameter d50 of <10 µm, preferably <5 µm, particularly preferably <2 µm, very particularly preferably <1.5 µm is particularly preferred.

The talc may be surface-treated, for example silanised, in order to ensure better compatibility with the polymer.

(IVa)

The use of compacted talc is advantageous with regard to the processing and production of moulding compositions.

Component D may be used as powder and/or pellets.

Component D is used in the compositions according to the present invention preferably in a quantity of 0 to 30 parts by weight, preferably of 0.1 to 20 parts by weight, particularly preferably of 0.5 to 10 parts by weight, in each case relative to the total of the parts by weight of Components A to D=100 parts by weight.

EXAMPLES

Component A-1

Linear polycarbonate based on bisphenol A, with a weight average molecular weight $\overline{M}_w$ of 28,000 g/mol (determined by GPC). The polycarbonate is present as pellets and contains approx. 150 ppm of VOCs.

Component A-2

Linear polycarbonate pellets based on bisphenol A, with a weight average molecular weight $\overline{M}_w$ of 28,000 g/mol (determined by GPC). The polycarbonate is present as powder and contains approx. 150 ppm of VOCs.

Component B

Pulverulent ABS graft polymer with core/shell structure produced by emulsion polymerisation consisting of 40 wt. % of styrene-acrylonitrile copolymer with a ratio of styrene to acrylonitrile of 72:28 wt. % as the envelope and 60 wt. % of a particulate grafting backbone with an average particle size $d_{50}$ of 0.3 μm as the core, wherein the grafting backbone consists of pure polybutadiene rubber. The graft polymer contains in total approx. 0.4 wt. % (4000 ppm) of VOCs and has a water content (residual moisture content) of approx. 1.0 wt. %.

Component C-1

Styrene/acrylonitrile copolymer with a styrene/acrylonitrile ratio by weight of 72:28 wt. % and an average molecular weight $M_w$ of 130,000 g/mol (measurement by GPC in dimethylformamide at 20° C.). The styrene/acrylonitrile copolymer was produced by bulk polymerisation using ethylbenzene as solvent. The styrene/acrylonitrile copolymer contains in total approx. 1000 ppm of VOCs. Component C-1 is used in pellet form.

Component C-2

Precompound of an ABS graft polymer produced in emulsion and an SAN polymer produced by bulk polymerisation using ethylbenzene as solvent. The precompound C-2 exhibits an acrylonitrile:butadiene:styrene ratio by weight of 20:28:52 wt. % and contains free SAN, i.e. which is not bound chemically to the rubber, with an average molecular weight $M_w$ of 100,000 g/mol (measurement by GPC in dimethylformamide at 20° C.). Component C-2 contains in total approx. 300 ppm of VOCs and is used in pellet form.

Component C-3

ABS graft polymer produced by emulsion polymerisation with an acrylonitrile:butadiene:styrene ratio by weight of 16:27:57 wt. %. Component C-3 contains in total approx. 1000 ppm of VOCs and is used in pellet form.

Component D

Component D-1: Phosphorus acid ester of bis-(2-hydroxy-3-cyclohexyl-5-methylphenyl)-methane according to the following formula (V), wherein Component D-1 is used in powder form.

(V)

Component D-2: Pentaerythritol tetrastearate as mould release agent in powder form.

Component D-3: Stabiliser Irganox® B900 (Ciba, Basel, Switzerland) in powder form.

Component D-4: Antioxidant Irganox 1076 (Ciba, Basel, Switzerland) in powder form.

Component D-5: Anhydrous citric acid in powder form.

Production and Testing of Moulding Compositions

The following composition was produced according to the methods described below on an Evolum® 32 HT twin-screw extruder made by Clextral (France) with a length to diameter ratio of L/D=36, hereinafter ZSK Evolum®:

Examples 1 to 5

42.7 parts by weight Component A-1
25.2 parts by weight Component B
31.2 parts by weight Component C-1
0.15 parts by weight Component D-1
0.75 parts by weight Component D-2

The content of VOCs introduced into the compounding process by the polymeric raw materials A to C, i.e. the total of the VOC contents of these initial raw materials, weighted in each case with the respective percentages of Components A to C in the composition, was around 1380 ppm in Examples 1 to 5.

Examples 6 to 9

70.23 parts by weight Component A-1
9.0 parts by weight Component B
4.8 parts by weight Component C-1
15.0 parts by weight Component C-2
0.75 parts by weight Component D-2
0.10 parts by weight Component D-3
0.10 parts by weight Component D-4
0.02 parts by weight Component D-5

The content of VOCs introduced into the compounding process by the polymeric raw materials A to C, i.e. the total of the VOC contents of these initial raw materials, weighted in each case with the respective percentages of Components A to C in the composition, was around 560 ppm in Examples 6 to 9.

Examples 10 to 12

40.7 parts by weight Component A-1
3.81 parts by weight Component A-2

5.9 parts by weight Component C-1
48.4 parts by weight Component C-3
0.74 parts by weight Component D-2
0.15 parts by weight Component D-3
0.20 parts by weight Component D-4
0.10 parts by weight Component D-5

The content of VOCs introduced into the compounding process by the polymeric raw materials A to C, i.e. the total of the VOC contents of these initial raw materials, weighted in each case with the respective percentages of Components A to C in the composition, was around 790 ppm in Examples 10 to 12.

The pellets resulting from the respective compounding operation were processed on an injection moulding machine (Arburg) at a melt temperature of 260° C. and a mould temperature of 80° C. to yield test specimens with the dimensions 80 mm×10 mm×4 mm.

Ductility is assessed by means of the notched bar impact value $a_k$ to ISO 180-1A at 23° C. and −30° C. and by means of the fracture photomicrograph which is obtained in the notched bar impact test under these conditions.

Heat resistance is assessed by means of the Vicat B120 value measured to ISO 306.

Melt flow behaviour is assessed by means of the melt volume flow rate (MVR) measured to ISO 1133 at a temperature of 260° C. and a punch load of 5 kg.

To determine the total VOC content and the content of 1,3-butadiene, the pellet sample is treated with γ-butyrolactone for several hours at 50° C. in a closed headspace vial. Analysis proceeds using headspace gas chromatography with flame ionisation detector using an internal standard.

In the following (comparative) examples, all indications of the input quantity of a component in parts by weight are in each case stated relative to the total of Components A to D=100 parts by weight.

Example 1

Comparison

A mixture (i) consisting of 9.1 parts by weight of pulverulent Component B, 0.15 parts by weight of pulverulent Component D-1 and 0.75 parts by weight of pulverulent Component D-2 was produced using a model CM100 mechanical mixer made by Mixaco Dr. Herfeld GmbH & Co. KG Maschinenfabrik (Neuenrade, Germany), hereinafter Mixaco mixer. In step (ii), this mixture was introduced via a separate metering hopper together with Components A-1, C-1 likewise metered in each case via separate storage tanks and the residual quantity of 16.1 parts by weight of Component B into the feed zone (3) of the ZSK Evolum®, see FIG. 1. In the melting and kneading zone (5) of the ZSK Evolum® the resultant mixture was brought to a temperature of approx. 260° C. and thereby melted, kneaded at this temperature and the liquefied components were thereby predispersed in one another. Subsequent dispersal took place in a dispersing/mixing zone (6) The mixture compounded in this way was devolatilised in the following devolatilising zone (7) of the ZSK Evolum® by application of a reduced pressure of approx. $p_{abs}$=100 mbar (absolute) to the melt. The devolatilised melt was then conveyed via a die (9) out of the ZSK Evolum®, in method step (iii) the resultant melt strand was conveyed through a water bath (10) adjusted to 30° C. for cooling and solidification, and the solidified polymer strand was subsequently pelletised by means of a strand pelletiser (11). The temperature of the melt on exit from the extruder die (9) was approx. 290° C.

Example 2

The method differs from Comparative Example 1 in the production of the powder mixture, in which 9.1 parts by weight of Component B were initially combined with 1.1 parts by weight relative to the total of Components A to D of water, initial homogenisation took place in the Mixaco mixer, then 0.15 parts by weight of pulverulent Component D-1 and 0.75 parts by weight of pulverulent Component D-2 were added and mixing was performed again using the Mixaco mixer. The resultant, water-moistened powder mixture was flowable and exhibited an added water content of 10 wt. %. In the method according to the schematic illustration in FIG. 1, this mixture was introduced via a separate metering hopper together with Components A-1, C-1 likewise metered in each case via separate storage tanks and the residual quantity of 16.1 parts by weight of Component B into the feed zone (3) of the ZSK Evolum®. In the melting and kneading zone (5) of the ZSK Evolum®, the resultant mixture was brought to a temperature of approx. 260 to 280° C. and thereby melted, the water was evaporated, the mixture was kneaded at this temperature and the liquefied components were thereby predispersed in one another. Subsequent dispersal took place in a dispersing/mixing zone (6) The mixture compounded in this way was devolatilised in the following devolatilising zone (7) of the ZSK Evolum® by application of a reduced pressure of approx. 100 mbar (absolute) to the melt. The devolatilised melt was then conveyed via a die (9) out of the ZSK Evolum®, the resultant melt strand was conveyed through a water bath (10) adjusted to 30° C. for cooling and solidification, and the solidified polymer strand was subsequently pelletised by means of a strand pelletiser (11). The mean residence time for which the polymer melt in the twin-screw extruder was in contact with water vapour, i.e. the mean residence time of the melt in the extruder portion between the first kneading zone and the devolatilising zone, was approx. 25 s in this method. The temperature of the melt on exit from the extruder die (9) was approx. 290° C.

Example 3

The method differs from Example 2 solely in the production of the powder mixture, in which 9.1 parts by weight of pulverulent Component B were initially combined with 2.5 parts by weight relative to the total of Components A to D of water, initial homogenisation took place in the Mixaco mixer, then 0.15 parts by weight of pulverulent Component D-1 and 0.75 parts by weight of pulverulent Component D-2 were added and mixing was performed again using the Mixaco mixer. The resultant, water-moistened powder mixture was flowable and exhibited an added water content of 20 wt. %.

Example 4

Comparison

The method differs from Example 2 solely in the production of the powder mixture, in which 9.1 parts by weight of pulverulent Component B were initially combined with 4.3 parts by weight relative to the total of Components A to D of water, initial homogenisation took place in the Mixaco mixer, then 0.15 parts by weight of pulverulent Component D-1 and 0.75 parts by weight of pulverulent Component D-2 were added and mixing was performed again using the Mixaco mixer. The resultant, water-moistened powder mixture was flowable and exhibited an added water content of 30 wt. %. During extrusion, problems quickly arose due to backing-up moisture in the feed zone of the ZSK Evolum®. As a result, compounding had to be terminated.

Example 5

Figure 2:
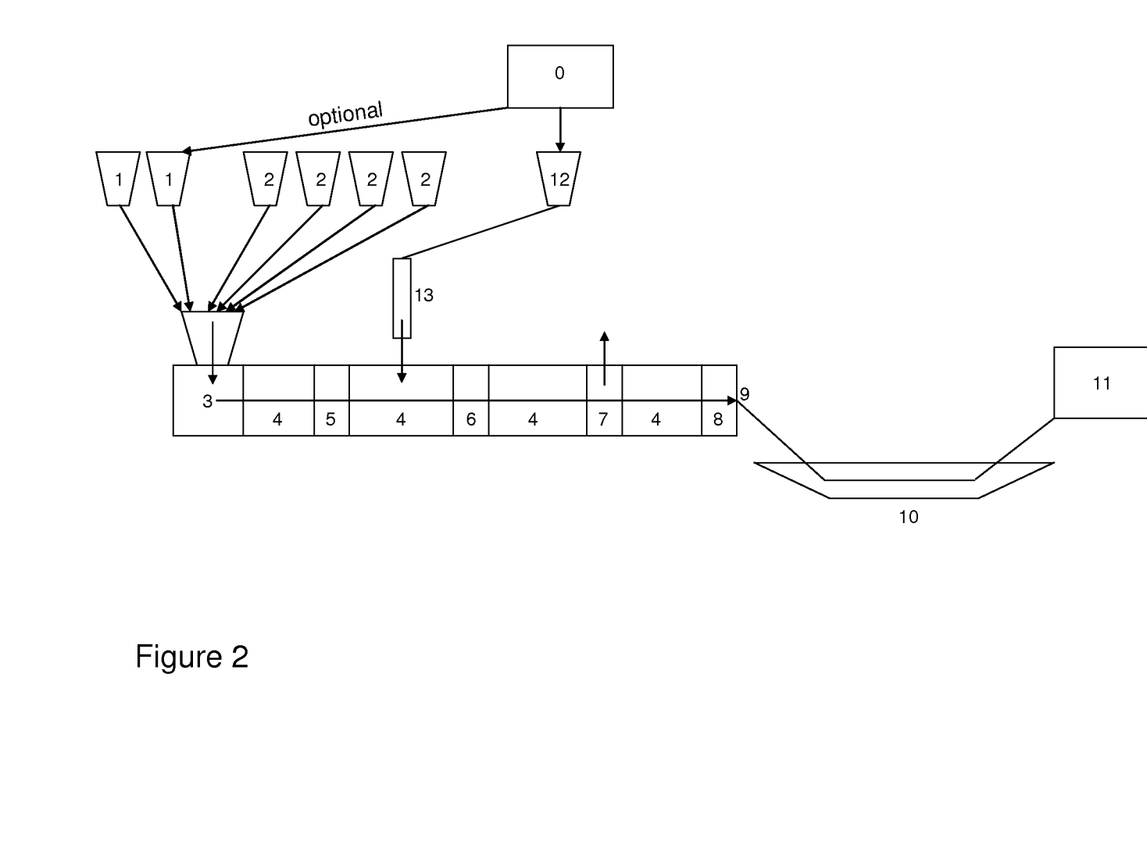

The method differs from Example 4 solely in that the powder mixture produced according to Example 4 and combined with 30 wt. % water, relative to the powder mixture, was not introduced together with the other components via a separate metering hopper into the feed zone (3) of the ZSK Evolum®, but rather in the method according to the schematic illustration in FIG. 2 was fed via an ancillary extruder (13) between the melting/kneading zone (5) on the one hand and the dispersing/mixing zone (6) on the other hand directly into the premixed melt of the mixture of the other components, the total mixture was subsequently dispersed in the dispersing/mixing zone (6) and the resultant melt of the polymer blend was devolatilised in the subsequent devolatilising zone (7) of the ZSK Evolum® through the application of a reduced pressure of $p_{abs}=100$ mbar (absolute) to the melt. The mean residence time for which the polymer melt in the twin-screw extruder was in contact with water vapour, i.e. the mean residence time of the melt in the extruder portion between the ancillary extruder and the devolatilising zone, was approx. 15 s in this method. The temperature of the melt on exit from the extruder die (9) was approx. 290° C.

Example 6

Comparison

A mixture of the pulverulent components B and D2 to D5 was produced in the Mixaco mixer. In the method according to the schematic illustration in FIG. 1, this mixture was introduced via a separate metering hopper together with Components A-1, C-1 and C-2 likewise metered in each case via separate storage tanks into the feed zone (3) of the ZSK Evolum®. In the melting and kneading zone (5) of the ZSK Evolum®, the resultant mixture was brought to a temperature of approx. 260 to 280° C. and thereby melted, kneaded at this temperature and the liquefied components were thereby pre-dispersed in one another. Subsequent dispersal took place in a dispersing/mixing zone (6) The mixture compounded in this way was devolatilised in the following devolatilising zone (7) of the ZSK Evolum® by application of a reduced pressure of approx. $p_{abs}=100$ mbar (absolute) to the melt. The devolatilised melt was then conveyed via a die (9) out of the ZSK Evolum®, the resultant melt strand was conveyed through a water bath (10) adjusted to 30° C. for cooling and solidification, and the solidified polymer strand was subsequently pelletised by means of a strand pelletiser (11). The temperature of the melt on exit from the extruder die (9) was approx. 300° C.

Example 7

The method differs from Comparative Example 6 in the production of the powder mixture, in which Component B was initially combined with 1.1 parts by weight relative to the total of Components A to D of water, initial homogenisation took place in the Mixaco mixer, then Components D2 to D5 were added and mixing was performed again using the Mixaco mixer. The resultant, water-moistened powder mixture was flowable and exhibited an added water content of 10 wt. %. This mixture was introduced via a separate metering hopper together with Components A-1, C-1 and C-2 likewise metered in each case via separate storage tanks into the feed zone (3) of the ZSK Evolum®. In the melting and kneading zone (5) of the ZSK Evolum®, the resultant mixture was brought to a temperature of approx. 260 to 280° C. and thereby melted, the water was evaporated, the mixture was kneaded at this temperature and the liquefied components were thereby predispersed in one another. Subsequent dispersal took place in a dispersing/mixing zone (6). The mixture compounded in this way was devolatilised in the following devolatilising zone (7) of the ZSK Evolum® by application of a reduced pressure of approx. $p_{abs}=100$ mbar (absolute) to the melt. The devolatilised melt was then conveyed via a die (9) out of the ZSK Evolum®, the resultant melt strand was conveyed through a water bath (10) adjusted to 30° C. for cooling and solidification, and the solidified polymer strand was subsequently pelletised by means of a strand pelletiser (11). The mean residence time for which the polymer melt in the twin-screw extruder was in contact with water vapour, i.e. the mean residence time of the melt in the extruder portion between the first kneading zone and the devolatilising zone, was approx. 25 s in this method. The temperature of the melt on exit from the extruder die (9) was approx. 300° C.

Example 8

A powder mixture was produced in that Component B was initially combined with 2.5 parts by weight relative to the total of Components A to D of water, initial homogenisation took place in the Mixaco mixer, then Components D2 to D5 were added and mixing was performed again using the Mixaco mixer. The resultant, water-moistened powder mixture was flowable and exhibited an added water content of 20 wt. %. As with Example 5, in the method according to the schematic illustration of FIG. 2, Components A, C-1 and C-2 were introduced via separate metering hoppers (2) into the feed zone (3) of the ZSK Evolum®. In the melting and kneading zone (5) of the ZSK Evolum®, the resultant mixture was brought to a temperature of approx. 260 to 280° C. and thereby melted, kneaded at this temperature and the liquefied components of the composition were thereby predispersed in one another. The water-moistened powder mixture was introduced into the polymer melt compounded in this way via the ancillary extruder (13) and the components of the composition were again dispersed in one another in the following dispersing/mixing zone (6). In the following devolatilising zone (7) of the ZSK Evolum®, the polymer alloy was devolatilised by application of a reduced pressure of approx. 100 mbar (absolute) to the melt. The devolatilised melt was conveyed via a die (9) out of the ZSK Evolum®, the resultant melt strand was conveyed through a water bath (10) adjusted to 30° C. for cooling and solidification, and the solidified polymer strand was subsequently pelletised by means of a strand pelletiser (11). The mean residence time for which the polymer melt in the twin-screw extruder was in contact with water vapour, i.e. the mean residence time of the melt in the extruder portion between the ancillary extruder and the devolatilising zone, was approx. 15 s in this method. The temperature of the melt on exit from the extruder die (9) was approx. 300° C.

Example 9

Example 9 differs from Example 8 solely in that during production of the powder mixture 4.3 parts by weight of water were added relative to the total of Components A to D. The resultant, water-moistened powder mixture was flowable and exhibited an added water content of 30 wt. %. The temperature of the melt on exit from the extruder die (9) was approx. 300° C.

Example 10

Comparison

A mixture of the pulverulent Components A-2 and D-2 to D-5 was produced in the Mixaco mixer. In the method according to the schematic illustration in FIG. 1, this premixture was introduced via a separate metering hopper (1) together with Components A-1, C-1 and C-3 likewise metered in each case via separate storage tanks (2) into the feed zone (3) of the ZSK Evolum®. In the melting and kneading zone (5) of the ZSK Evolum®, the resultant mixture was brought to a temperature of approx. 260 to 280° C. and thereby melted, kneaded at this temperature and the liquefied components were thereby pre-dispersed in one another. Subsequent dispersal took place in a dispersing/mixing zone (6) The mixture compounded in this way was devolatilised in the following devolatilising zone (7) of the ZSK Evolum® by application of a reduced pressure of approx. $p_{abs}$=100 mbar (absolute) to the melt. The devolatilised melt was then conveyed via a die (9) out of the ZSK Evolum®, the resultant melt strand was conveyed through a water bath (10) adjusted to 30° C. for cooling and solidification, and the solidified polymer strand was subsequently pelletised by means of a strand pelletiser (11). The temperature of the melt on exit from the extruder die (9) was approx. 280° C.

Example 11

Comparison

The method differs from Comparative Example 10 in the production of the powder mixture, in which pulverulent Components A-2 and D-2 to D-5 were initially combined with 0.55 parts by weight of water relative to the total of Components A to D and homogenisation was performed in the Mixaco mixer. The resultant, water-moistened powder mixture was flowable and exhibited an added water content of 10 wt. %. As with Example 5, in the method according to the schematic illustration of FIG. 2, Components A, C-1 and C-2 were introduced via separate metering hoppers (2) into the feed zone (3) of the ZSK Evolum®. In the melting and kneading zone (5) of the ZSK Evolum®, the resultant mixture was brought to a temperature of approx. 260 to 280° C. and thereby melted, kneaded at this temperature and the liquefied components of the composition were thereby predispersed in one another. The powder mixture combined with water was introduced into the polymer melt compounded in this way via the ancillary extruder (13) and the components of the composition were dispersed in one another in the following dispersing/mixing zone (6). In the following devolatilising zone (7) of the ZSK Evolum®, the polymer alloy was devolatilised by application of a reduced pressure of approx. $p_{abs}$=100 mbar (absolute) to the melt. The devolatilised melt was conveyed via a die (9) out of the ZSK Evolum®, the resultant melt strand was conveyed through a water bath (10) adjusted to 30° C. for cooling and solidification, and the solidified polymer strand was subsequently pelletised by means of a strand pelletiser (11). The mean residence time for which the polymer melt in the twin-screw extruder was in contact with water vapour, i.e. the mean residence time of the melt in the extruder portion between the ancillary extruder and the devolatilising zone, was approx. 15 s in this method. The temperature of the melt on exit from the extruder die (9) was approx. 280° C.

Example 12

Comparison

The method differs from Comparative Example 11 solely in that during production of the powder mixture 1.25 parts by weight of water were added, relative to the total of Components A to D. The resultant, water-moistened powder mixture was flowable and exhibited an added water content of 20 wt. %. The temperature of the melt on exit from the extruder die (9) was approx. 280° C.

TABLE 1

Properties of the Examples according to the invention and Comparative Examples

|  | 1 (comparison) | 2 | 3 | 5 |
|---|---|---|---|---|
| $a_k$ (23° C.) [kJ/m²] | 79 | 77 | 83 | 80 |
| Fracture pattern | ductile | ductile | ductile | ductile |
| $a_k$ (−30° C.) [kJ/m²] | 44 | 39 | 53 | 63 |
| Fracture pattern | ductile | ductile | ductile | ductile |
| MVR [ml/10 min] | 13 | 16 | 13 | 11 |
| Vicat B120 [° C.] | 112 | 113 | 113 | 113 |
| Residual volatiles content |  |  |  |  |
| Butadiene [ppm] | 1.3 | 0.9 | 0.8 | 0.9 |
| Total VOCs [ppm] | 802 | 484 | 309 | 383 |

TABLE 2

Properties of the Examples according to the invention and Comparative Examples

|  | 6 (comparison) | 7 | 8 | 9 |
|---|---|---|---|---|
| $a_k$ (23° C.) [kJ/m²] | 49 | 49 | 49 | 51 |
| Fracture pattern | ductile | ductile | ductile | ductile |
| $a_k$ (−30° C.) [kJ/m²] | 45 | 46 | 44 | 45 |
| Fracture pattern | ductile | ductile | ductile | ductile |
| MVR [ml/10 min] | 11 | 12 | 14 | 12 |
| Vicat B120 [° C.] | 132 | 133 | 134 | 134 |
| Residual volatiles content |  |  |  |  |
| Butadiene [ppm] | 1.7 | 1.4 | 1.3 | 1.4 |
| Total VOCs [ppm] | 191 | 97 | 75 | 84 |

The Examples in Tables 1 and 2 show that, through the method according to the invention, a reduction of butadiene monomers of up to approx. 40% and of total VOC content of up to as much as approx. 60% relative to the method according to the prior art may be achieved (compare Example 3 with Comparative Example 1 and Example 8 with Comparative Example 6). The residual monomer content is further reduced by increasing the water content in the powder premixture from 10 to 20% (compare Examples 2 and 3 and Examples 7 and 8). A reduction in residual volatiles content relative to the prior art is achieved both when the powder premixture is metered via the main feed zone (Examples 2 and 3 and Example 7) and when the powder premixture is metered into the melt mixture of the remaining blend components via an ancillary extruder (Example 5 and Examples 8 and 9), wherein introduction of the powder premixture via the main feed zone has however proven slightly advantageous with regard to reduction of the residual volatiles content (compare Examples 3 and 5).

The Examples in Table 1 show moreover that the use of water as an entraining agent in accordance with a method according to the invention does not seem to have a negative effect on the applicational properties of the blend (flowability, toughness, heat resistance) due to the mild compounding conditions (low temperatures associated with a short residence time). It may be concluded from this, that the integrity of the polycarbonate molecular weight and of the impact modifier is capable of being maintained unimpaired in process according to the present invention. The lower content of 1,3-butadiene in the compositions produced by methods according to the present invention, compared with the Comparative Examples, suggests, moreover, that the maximum temperature (hot spot temperature) in a method according to the present invention is altogether lower than in the method according to the prior art.

TABLE 3

Properties of further Comparative Examples

|  | 10 (comparison) | 11 (comparison) | 12 (comparison) |
| --- | --- | --- | --- |
| $a_k$ (23° C.) [kJ/m$^2$] | 65 | 55 | 53 |
| Fracture pattern | ductile | ductile | ductile |
| $a_k$ (−30° C.) [kJ/m$^2$] | 63 | 51 | 48 |
| Fracture pattern | ductile | ductile | ductile |
| MVR [ml/10 min] | 10 | 9 | 9 |
| Vicat B120 [° C.] | 114 | 113 | 110 |
| Residual volatiles content |  |  |  |
| Butadiene [ppm] | 0.4 | 0.4 | 0.4 |
| Total VOCs [ppm] | 285 | 280 | 285 |

Comparative Examples 10 to 12 in Table 3 show that an alternative method, in which water as entraining agent is attached not to an absorbent graft polymer but rather in a comparable absolute quantity to an additive mixture based on polycarbonate powder as carrier, does not lead to any comparable reduction in the residual volatiles contents. It has thus surprisingly been found that the method of feeding water into the polymer melt of the compound is of important significance when it comes to solving certain problems underlying the present invention. A reduction in the level of residual volatiles is surprisingly achieved when the water is introduced into the compounding method attached to an absorbent graft polymer.

The invention claimed is:

1. A method for producing an impact-modified polymer composition comprising:
A) at least one rubber-free organic thermoplastic polymer,
B) at least one pulverulent graft polymer consisting of
B.1) a vinyl (co)polymer as envelope, and
B.2) an elastomer as core,
wherein the graft polymer has a residual content of volatile organic compounds (VOC) of no more than 10,000 ppm,
C) optionally a further polymer resin that is at least one polymer selected from the group consisting of a rubber-free vinyl (co)polymer C.1 and a pellet-form rubber-modified vinyl (co)polymer C.2,
D) optionally at least one polymer additive different from components A, B and C, wherein said polymer additive is selected from the group consisting of flame retardants, flameproofing synergists, smoke-retarding additives, antidripping agents, internal and external lubricants and mould release agents, rheological auxiliaries, antistatic agents, conductivity additives, stabilisers, antibacterially active additives, scratch resistance-improving additives, IR absorbents, optical brighteners, fluorescent additives, fillers and reinforcing materials, dyes, pigments, Brønsted acid compounds, and mixtures thereof,
wherein the total of the VOC contents of initial raw materials, weighted in each case with the respective percentages of components A to C in the composition, is more than 600 ppm and UP to 2000 ppm,
said method comprising:
(i) producing a mixture with a water content, relative to the mixture produced in step (i), of 2 to 40 wt. % from
the total quantity or a proportion of the component B used,
optionally the total quantity or proportions of components A, C and/or D
0.2 to 7 parts by weight (based on the sum of the parts by weight of components A+B+C+D=100), of water,
(ii) heating the mixture resulting from step (i) together with the respective total quantities or the proportions of components A to D of the composition remaining after step (i) in a compounding unit by input of thermal and/or mechanical energy to a temperature of 200° C. to 350° C., and thereby melting, mixing and/or dispersing the different components A to D in one another and subsequently devolatilising the melt of the resulting mixture in a devolatilising zone of the compounding unit to form a devolitised premixed melt,
wherein the compounding unit comprises a melting and mixing zone or a combined melting and mixing zone,
wherein the mixture resulting from step (i) is optionally metered into the compounding unit completely, or optionally in each case partially (a) together with the residual quantities of components A to D of the composition into a zone upstream of a melting zone, and/or alternatively (b) into a zone downstream of the melting zone directly into the premixed melt of the components of the composition metered into a feed zone of the compounding unit,
wherein an absolute pressure n of $p_{abs}$ at most 800 mbar is established in compounding the devolatilising zone of the compounding unit,
(iii) resolidifying the melt resulting from step (ii) by cooling on discharge from the compounding unit
wherein the impact-modified polymer composition has a volatile organic compounds (VOC) content of no more than 600 ppm.

2. A method according to claim 1, wherein in step (i) 0.4 to 7 parts by weight (based on the sum of the parts by weight of components A+B+C+D=100), of water is added.

3. A method according to claim 1, wherein in step (ii), the mean residence time, for which the melt of the composition is in contact with the water from the mixture produced in step (i), is limited to at most 90 seconds.

4. A method according to claim 1, wherein a twin-screw extruder is used as the compounding unit.

5. A method according to claim 4, wherein the twin-screw extruder has a screw length/diameter ratio of 32 to 44.

6. A method according to claim 1, wherein at least one polymer produced by a polycondensation reaction is used as component A.

7. A method according to claim 1, wherein component A comprises at least one polymer selected from the group consisting of polycarbonate, polyester carbonate, and polyester.

8. A method according to claim 1, wherein component B comprises an ABS graft polymer or MBS graft polymer.

9. A method according to claim 1, wherein the mixture according to method step (i) consists solely of pulverulent components A to D and water.

10. A method according to claim 1, wherein in method step (i) a mixture with a water content relative to said mixture produced in step (i), of 5 to 32 wt. % is produced from
the total quantity or a proportion of the component B used,
optionally the total quantity or proportions of components A, C and/or D,
and 0.7 to 5 parts by weight (based on the sum of the parts by weight of components A+B+C+D=100), of water.

11. A method according to claim 1, wherein in method step (i) a mixture with a water content, relative to said mixture produced in step (i), of 8 to 25 wt. % is produced from
the total quantity or a proportion of the component B used,
optionally the total quantity or proportions of components A, C and/or D,
and 1.0 to 3 parts by weight (based on the sum of the parts by weight of components A+B+C+D=100), of water.

12. A method according to claim 1, wherein in method step (i), a mixture is produced consisting of
5 to 15 parts by weight (based on the sum of the parts by weight of components A+B+C+D=100), of component B,
0 to 5 parts by weight (based on the sum of the parts by weight of components A+B+C+D=100), of pulverulent component D and
8 to 25 parts by weight of water, relative to the mixture produced in step (i).

13. A method according to claim 1 for producing an impact-modified polymer composition comprising
10 to 95 parts by weight of component A,
3 to 60 parts by weight of component B,
0 to 60 parts by weight of component C, and
0 to 30 parts by weight of component D,
wherein the sum of the parts by weight of components A+B+C+D=100.

14. A method according to claim 1 for producing an impact-modified polymer composition comprising
40 to 80 parts by weight of component A,
5 to 30 parts by weight of component B,
5 to 35 parts by weight of component C, and
0.5 to 10 parts by weight of component D,
wherein the sum of the parts by weight of components A+B+C+D=100.

15. A method according to claim 1, wherein in step (ii) the mixture resulting from step (i) is metered into the compounding unit completely, together with residual quantities of components A to D, into a zone upstream of a melting zone.

16. A method of producing an impact-modified polymer composition comprising
40 to 80 parts by weight of at least one polymer selected from the group consisting of polycarbonate, polyester carbonate, and polyester as component A,
5 to 30 parts by weight of at least one pulverulent graft polymer selected from the group consisting of ABS graft polymer and MBS graft polymer as component B,
5 to 35 parts by weight of component C, and
0.5 to 10 parts by weight of component D,
wherein the sum of the parts by weight of components A+B+C+D=100, and wherein the total of the VOC contents of initial raw materials, weighted in each case with the respective percentages of components A to C in the composition, is more than 600 ppm and UP to 2000 ppm,
said method comprising
(i) producing a mixture consisting of
5 to 15 parts by weight (based on the sum of the parts by weight of components A+B+C+D=100), of component B,
0 to 5 parts by weight (based on the sum of the parts by weight of components A+B+C+D=100), of pulverulent component D and
8 to 25 parts by weight of water, relative to the mixture produced in this step (i),
(ii) heating the mixture resulting from step (i) together with the respective total quantities or the proportions of components A to D of the composition remaining after step (i) in a twin-screw extruder by input of thermal and/or mechanical energy to a temperature of 230° C. to 300° C., and thereby melting, mixing, and/or dispersing the different components A to D in one another and subsequently devolatilising the melt of the resulting mixture by the application of a reduced pressure,
wherein a compounding unit comprises in each case at least one, optionally combined melting and mixing zone and at least one devolatilising zone,
wherein the mixture resulting from step (i) is metered into the compounding unit completely, together with the residual quantities of Components A to D of the composition, into a zone upstream of a melting zone,
wherein an absolute pressure $p_{abs}$ of at most 500 mbar is established in a devolatilising zone of the compounding unit,
wherein the mean residence time, for which a melt of the composition is in contact with the water from the mixture produced in step (i), is limited to at most 60 seconds,
(iii) resolidifying a melt resulting from step (ii) by cooling on discharge from the compounding unit
wherein the impact-modified polymer composition has a volatile organic compounds (VOC) content of no more than 600 ppm.

* * * * *